United States Patent [19]

Carbone et al.

[11] Patent Number: 5,128,859
[45] Date of Patent: Jul. 7, 1992

[54] ELECTRONIC ACCIDENT ESTIMATING SYSTEM

[76] Inventors: Albert R. Carbone, 2300 Ward Ave. #503, Ville St. Laurent, Quebec H4M 2V3; Filippo di Fusco, 3113 Bonneville, Longueuil, Quebec J4M 1K4; Dominic Carbone, 8033 Joliot Curie, Montreal, Quebec H1E 2T1, all of Canada

[21] Appl. No.: 618,166

[22] Filed: Nov. 26, 1990

[30] Foreign Application Priority Data

Sep. 12, 1990 [CA] Canada ................................ 2025201

[51] Int. Cl.⁵ ............................................. G06F 15/21
[52] U.S. Cl. ............................................. 364/401
[58] Field of Search .................... 364/401, 413.13, 400

[56] References Cited

U.S. PATENT DOCUMENTS

| | | | |
|---|---|---|---|
| 4,774,562 | 9/1988 | Chen et al. | 358/13 |
| 4,833,625 | 5/1989 | Fisher et al. | 364/518 |
| 4,845,636 | 7/1989 | Walker | 364/479 |
| 4,899,292 | 2/1990 | Montagna et al. | 364/521 |

FOREIGN PATENT DOCUMENTS 0145464 6/1987 Japan .

OTHER PUBLICATIONS

*PTS New Product Announcements*, Dialog Accession No. 0168486, Nov. 2, 1987, "Lasodyne Unveils Multi-User . . . ".

*Communications Week*, Jun. 4, 1990, p. 28, "Color Fax's Future".

Primary Examiner—Dale M. Shaw
Assistant Examiner—David Huntley
Attorney, Agent, or Firm—Chilton, Alix & Van Kirk

[57] ABSTRACT

An electronic accident estimating system has been produced by integrating commercially available electronic hardware with proprietary software developed expressly for the estimating system. Electronic images of accidented vehicles are taken by the bodyshop estimator. These images are then imported to a computer by using a color video digitizer. The images, once resident in the computer, provide the visual evidence substantiating the estimated accident damage. The bodyshop estimator fills in the accident estimate on the computer, highlighting areas on the various images as required. Once the estimate is completed, the estimate file is compressed in size and transmitted electronically to the insurance company. At the insurance company, an insurance estimator then decompresses the estimate file and begins to peruse the estimate. If further clarification is required, the insurance estimator can request more images to be taken and transmitted. Execution of repairs can also be easily audited by the insurance company by simply requesting that images be taken during the repairs at specific repair milestones (replacement of body panels, application of primer, etc.) and transmitted to their office. The system also provides on-line archiving of accident estimates.

15 Claims, 5 Drawing Sheets

ELECTRONIC ACCIDENT ESTIMATING SYSTEM

FIELD OF THE INVENTION

This invention relates to an accident estimating system that permits the electronic acquisition, transmission and archiving of accident specific images and estimates.

DEFINITION

In the following description and in the appended claims, the term "accidented vehicle" shall mean "a vehicle which was involved in an accident".

BACKGROUND OF THE INVENTION

Current accident estimation practices involve several steps which are time consuming, error prone and susceptible to fraud. An accidented vehicle site. Once at the site, the insurace company estimator must assess the vehicle damage and take photographs of the vehicle for use as substantiating evidence. The insurance company estimator then must negotiate the extent of the repair costs with the bodyshop estimator. Once repairs commence, the insurance estimator may choose to audit the repairs to ensure that the repairs are being done as agreed to. After the repairs are completed, the insurance estimator must inspect the finished product. This process involves, at a minimum, three trips to the bodyshop. It does not account for any extra steps required as a result of latent accident damage uncovered only after the accident repairs have commenced. Such latent damage necessitates an extra trip to the bodyshop by the insurance estimator and a modification to the repair cost estimate.

Travelling to various bodyshops can account for a significant part of an insurance estimator's day. Hours spent travelling are hours not spent estimating. A hurried estimator is prone to overlook details which could be used to drive up the cost of an estimate.

Photographs of the vehicle, unless of the "instant developing" type which can be verified on the spot, may not turn out well, thus eliminating visual evidence of the accident damage. By the time it is ascertained that the photographs are no good, the accident repairs may be well under way.

Unscrupulous insurance estimators and bodyshops can collude to artificially inflate the cost of the repairs for some form of kickback or payoff.

It is the insurance companies, and, ultimately, the consumers who pay the price for the inefficiencies and dishonesty.

SUMMARY OF THE INVENTION

The invention, herein described, was developed to provide a fast, efficient, error-free and completely auditable method of producing, costing and archiving accident estimates, including accident specific images.

The invention can be viewed as five integrated processes: image acquisition; estimate preparation and compression; estimate perusal; estimate transmission; and, estimate archiving.

Video images of an accidented vehicle are imported to a computer by using a color video digitizer in conjunction with the image acquisition function. These images are reviewed by the computer operator (bodyshop estimator), and those pertinent to the accident damage are retained. Using the image acquisition function, the operator then highlights and annotates these images as required to show the accident damage. The computerized estimate is then completed by the operator through the use of the estimate preparation function. Once completed, the estimate data and images are automatically compressed in size for archiving economy and shorter data transmission times. The compressed estimate is then archived locally and subsequently transmitted electronically to the insurance company. Once received by the insurance company, the estimate is able to be reviewed and/or archived by an operator through the use of the estimate perusal and archiving functions. Should the need arise for further images to be taken for clarification and/or more data required, the same procedure is followed. The additional images and/or data are automatically appended to the correct estimate.

BRIEF DESCRIPTION OF THE DRAWINGS

A preferred embodiment of the present invention will be described in conjunction with the attached drawings, in which.

DESCRIPTION OF THE PREFERRED EMBODIMENT

A preferred embodiment of the present invention will now be described in detail.

Figure 1:
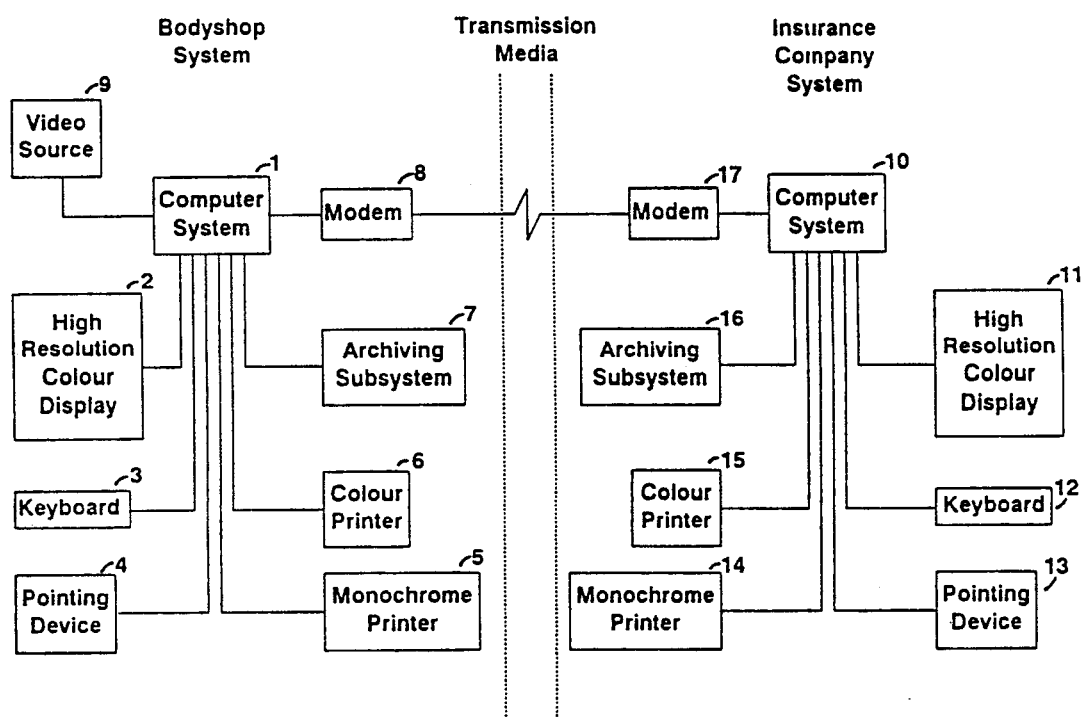
FIG. 1 is a block diagram of the preferred embodiment of the invention.

As shown in FIG. 1, the preferred embodiment of the invention contains two computer based systems: a bodyshop system and an insurance company system. The two systems communicate via modems 8 and 17 over an appropriate transmission media. The transmission media can be an ordinary telephone line, a data quality line, a radio link or any other transmission media suitable for inter-computer communications.

The bodyshop system is comprised of a computer system 1, a high resolution color display 2, a keyboard 3, a pointing device 4, a monochrome printer 5, a color printer 6, an archiving sybsystem 7, a modem 8 and a video source 9. The bodyshop system software is resident on computer system 1.

Examples of the various elements are now given:

1) The computer system is an IBM PC-At compatible with a '386 CPU, '387 co-processor, 4 Megabytes of memory, hard disk and floppy disk controller, 2 serial ports, 2 parallel ports, a keyboard port, and a power supply.

2) The high resolution color display is a 'Super VGA' type which provides a resolution of 1024 by 768 picture elements with an infinite color display capability. Monitor model number CM8484E by 'AAMAZING Technologies Inc.' of Mississauga, Ontario is used in the current embodiment of the invention.

3) The keyboard is an IBM PC-AT standard type with 102 keys (12 of which are function keys).

4) The pointing device is a mouse, trackball, joystick or any such device which permits the user to manipulate a pointer on the screen. A Microsoft serial mouse is used in the current embodiment of the invention.

5) The monochrome printer is a standard IBM-PC compatible printer and can be of the dot matrix, thermal or laser type. It is capable of printing 80 or 132 characters on 8.5"×11" paper.

6) The color printer is a standard 300 dots per inch thermal-wax color printer that is IBM-PC compatible, such as the Tektronix (Portland, Oreg., U.S.A.) Phaser PX printer.

7) The archiving subsystem is a 'write once' optical storage system with removable optical media capable of storing 1003 MegaBytes of data. The APX-5000 Series optical disk subsystem by Maximum Storage Inc. of Colorado Springs, Colo., U.S.A. is used in the current embodiment of the invention.

8) The modem is an ATI Technologies (Scarborough, Ontario) model 2400etc/e 2400 bit per second modem with MNP level 5 data compression. (MNP is a registered trademark of Microcom, Inc.)

9) The video source is a standard video camera (Sony CamCorder) or a still video camera (Canon XAP Shot RC-250). The Canon XAP Shot RC-250 is used in the current embodiment of the invention.

The insurance company system is comprised of a computer system 10, a high resolution color display 11, a keyboard 12, a pointing device 13, a monochrome printer 14, a color printer 15, an archiving subsystem 16, and a modem 17. The insurance company system software is resident on computer system 10.

All elements, save for the video source, of the insurance company computer system are identical to like elements of the bodyshop computer system.

Figure 2:
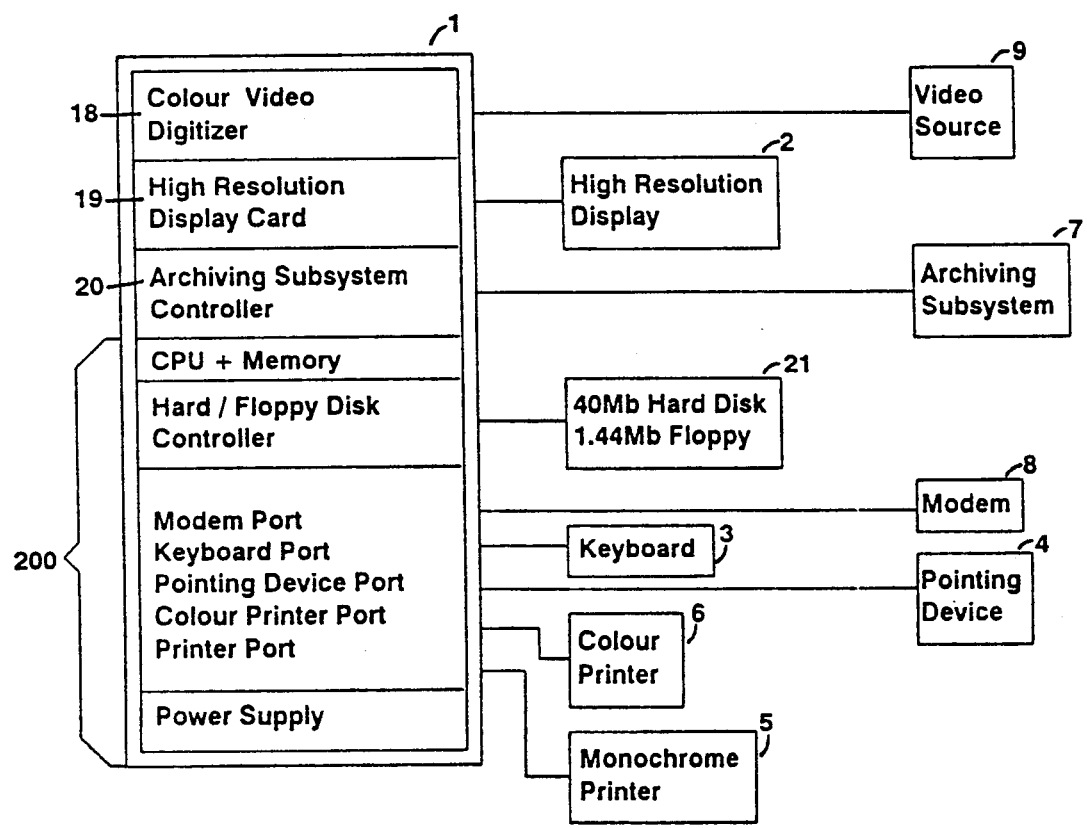
FIG. 2 is a block diagram of the computer system configuration for a bodyshop.

FIG. 2 further illustrates the bodyshop computer system configuration. Within the computer 1 is found a color video digitizer 18, a high resolution color display card 19, an archiving subsystem controller 20 and the hard disk/floppy disk combination 21. The CPU, memory, disk controllers, input/output ports and power supply, illustrated at 200, form the basic equipment found in the computer.

Examples of the various elements are now given:

18) The color video digitizer is an OCULUS-20 by Coreco, Inc., St. Laurent, Quebec. It acquires an image from the video source with a resolution of 640 by 480 picture elements and a color resolution of 4096 distinct colors.

19) The high resolution color display card is an ATI Technologies VGA Wonder with 512 KiloBytes of display memory. The card is capable of displaying images with a resolution of 640 by 480 picture elements with 256 distinct colors or 1024 by 768 picture elements with 16 distinct colors.

20) The archiving subsystem controller is the APX-4402 optical disk controller made by Maximum Storage Inc.

21) The 40 Mb hard disk and 1.44 Mb floppy disk are standard type devices common to IBM PC compatible computers.

Figure 3:
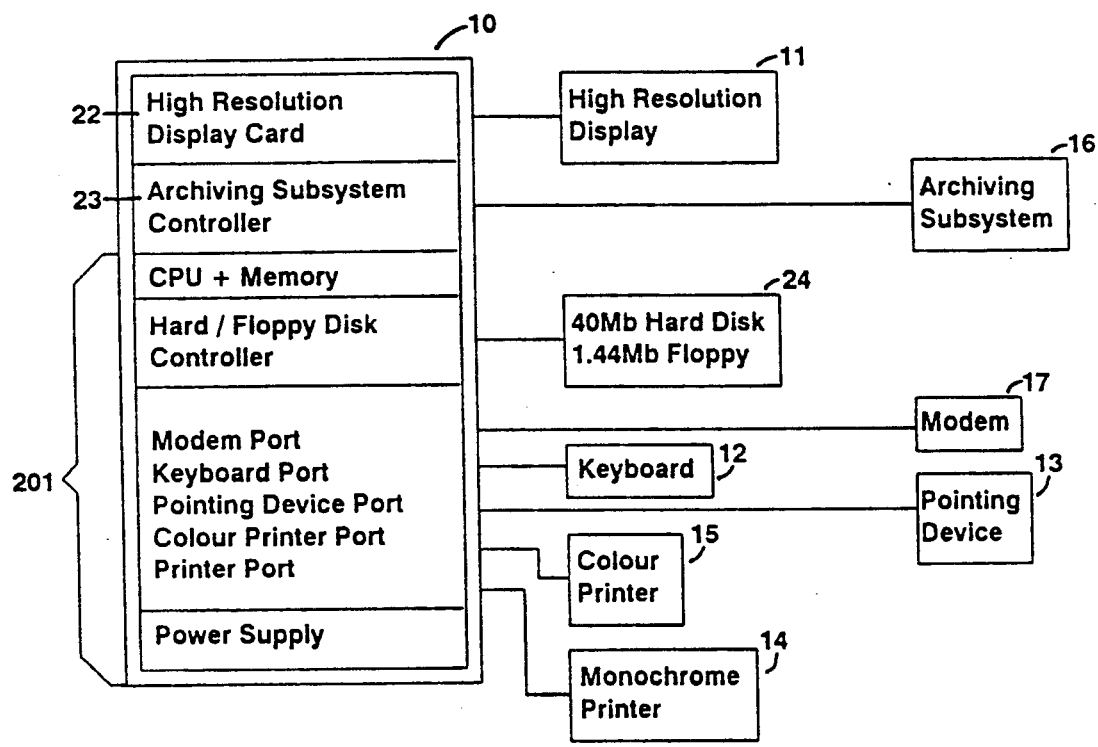
FIG. 3 is a block diagram of the computer system configuration for an insurance company.

The insurance company computer system configuration is shown in FIG. 3. Within the computer 10 is found a high resolution color display card 22, an archiving subsystem controller 23 and the hard disk/floppy disk combination 24. The CPU, memory, disk controllers, input/output ports and power supply, illustrated at 201, form the basic equipment found in the computer.

All elements of the insurance company computer system are identical to like elements of the bodyshop computer system.

Figure 4:
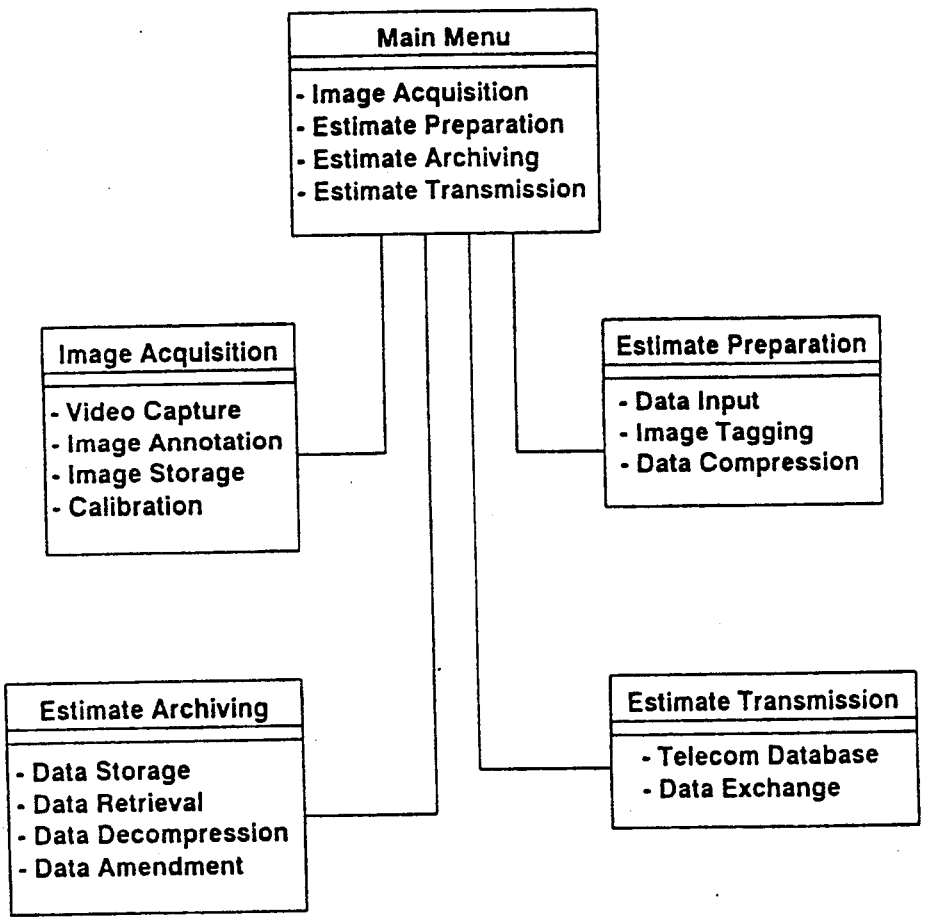
FIG. 4 is a menu tree outlining the functionality of the system software resident on the bodyshop computer described in FIG. 2.

The bodyshop system software is best described in conjunction with the menu tree presented in FIG. 4. Upon innovation of the system software, the operator is given access to four functions: Image acquisition; Estimate preparation; Estimate archiving; and, Estimate transmission. Each function will be discussed separately.

The image acquisition function is used to acquire images, prepare them for estimation purposes and provide temporary storage. As an additional feature, a calibration function is provided to maintain digitized image clarity and quality.

The video capture function permits the operator to screen video images and select those that best show the accident damage. The video source is connected to the color video digitizer. The video capture function then triggers the color digitizer to acquire an image. Once acquired, the image data is transformed and copied to the high resolution display card, thereby causing the image to be displayed on the high resolution monitor. The image annotation function allows the operator to enter textual and graphical information on the images. This serves to permit highlighting of accidented areas with, say, a circle or square, and to put claim numbers, sequence numbers or notes on the image. This function requires the operator to use the pointing device, which manipulates a graphical pointer on the display, to delineate the areas on the image that need to be outlined. Also by using the pointing device, the operator selects where on the image text is to appear and subsequently types the text on the keyboard. As the text is typed, it appears on the screen at the appropriate location. The image storage function provides the operator simple databasing operations on the images such as storage, retrieval, and deletion. This temporary storage is used to contain the selected images that will form part of an estimate. The calibration function permits the operator to adjust the color video digitizer board to the video source to ensure maximum image fidelity, clarity and quality. This is done by acquiring an image and invoking the calibration function. The calibration function then analyzes the brightness and contrast of the image and makes the appropriate adjustments, through software, to the color video digitizer board so that all subsequent images acquired will have the optimum brightness and contrast settings. The operator is free to invoke the calibration function as often as is desired. The entire calibration process takes no more than 20 seconds.

The estimate preparation function is used to input data, tag images, compute estimate cost and compress completed estimate data packages.

Data input, as the name implies, is the function invoked by the operator to enter estimate data. This function accepts all the data pertaining to an estimate through a screen oriented "fill in the field" format. Data such as vehicle owner name, address, phone number, insurance company name, policy number, vehicle type and serial number, and other similar clerical data items are entered through this function. The estimate data, comprising of part number, part labour disposition (repair, replace or remove and reinstall), part cost, labour time and painting time are also entered, as well as any subcontracted work (towing, wheel alignment, etc.). The total estimate cost is updated as items are added to the estimate data. An additional form field is reserved for cross-referencing to the images tagged to the estimate. The image tagging function is used to identify which images in the temporary image store pertain to a particular estimate.

Once an estimate data package is consolidated (filled forms, parts and labour totals, images tagged), the data compression function is invoked to reduce the size of the data package for economies of transmission and archiving space requirements. The data compression is implemented in software through the use of standard data compression algorithms. Data compression can also be done via a circuit card designed specifically for the task. The system currently does not employ such a circuit card, but provisions for the inclusion of a compression card exist in the software. A compression card would reduce the time required for the data compression to be accomplished.

The estimate archiving function is used to store, retrieve, decompress and amend compressed data packages. The data store function allows the operator to enter compressed estimate data packages into the archive database. The data retrieval function extracts a copy of the compressed estimate data package from the archive database. The data decompression function decompresses the data package to permit perusal of the estimate. The decompression function is implemented in software, using the inverse of the compression algorithm. Should a compression card be employed for the data compression, the same card would perform the data decompression function.

It is important to note that the compression/decompression algorithms employed produce the same results whether they are implemented in hardware or software. This means that data compressed by hardware could be decompressed by software, and, conversely, data compressed by software could be decompressed by hardware.

The data amendment function is used to add data to an estimate. This addition does not modify the original estimate data, but is appended to it. The appended data is stored in compressed form.

The estimate transmission function is invoked when an estimate is to be sent to the insurance company. The telecom database function is used to establish a communications link with the appropriate insurance company computer system. Once the link is established, the data exchange function transmits the estimate. It is also possible to receive an estimate back from the insurance company with notes/comments/questions on it. In this case, the data exchange function receives the estimate. Details of such a transmission are elaborated upon in the explanation of the insurance company system software.

Figure 5:
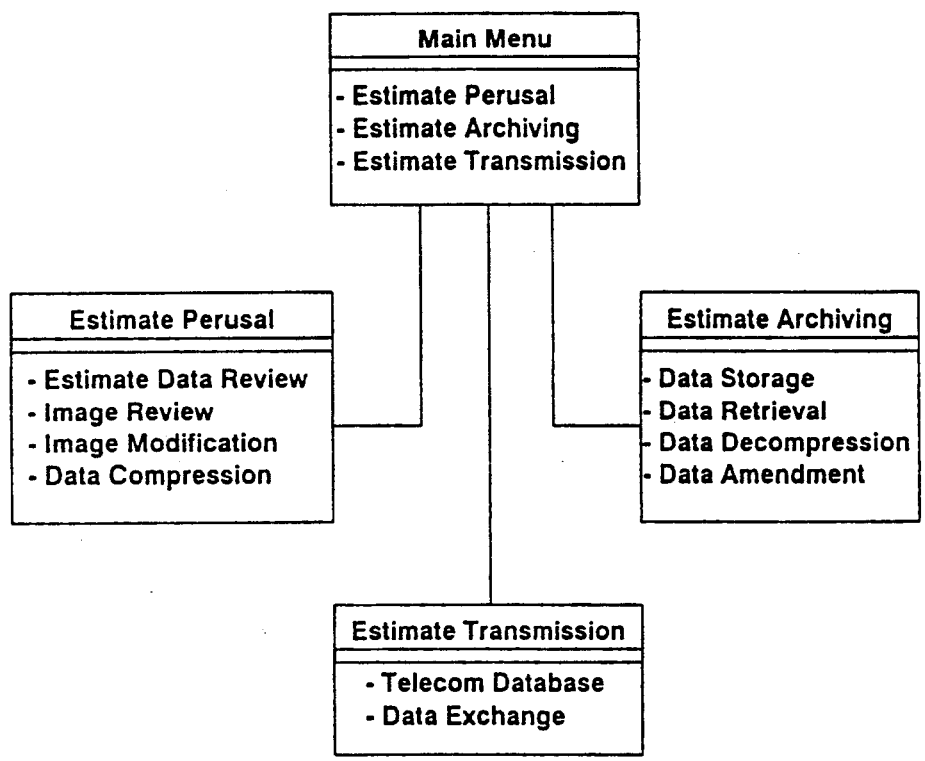
FIG. 5 is a menu tree outlining the functionality of the system software resident on the insurance company computer described in FIG. 3.

The insurance company system software is best described in conjunction with the menu tree presented in FIG. 5. Upon invocation of the system software, the operator is given access to three functions: Estimate perusal; Estimate archiving; and, Estimate transmission. Each function will be discussed separately.

The estimate perusal function allows the operator to review estimate data and images, to modify images and to compress images for transmission to the appropriate bodyshop.

Using the estimate data review function, the operator can peruse an estimate on the computer display or get it printed. Similarly, the image review function permits on-screen display or color printing of the estimate images. The image modification function is used by the operator to annotate estimate images and make notes when a clarification is required by the bodyshop. For example, if an image shows a damaged area from a certain perspective, the operator may indicate, by marking the image and making notes, that a new image or images from a different perspective or a close-up image are desired. The pointing device and keyboard are used for this function, as described earlier for the bodyshop system. The data compression function is used to reduce the size of the data package (images with notes and markings) for economies of transmission and archiving space requirements.

The estimate archiving function is used to store, retrieve, decompress and amend compressed data packages. The data store function allows the operator to enter compressed estimate data packages into the archive database. The data retrieval function extracts a copy of the compressed estimate data package from the archive database. The data decompression function decompresses the data package to permit perusal of the estimate. The data amendment function is used to add data to an estimate. This addition does not modify the original estimate data, but is appended to it. The appended data is stored in compressed form. As in the bodyshop system, all compression/decompression is implemented in software, but the provisions for using a hardware compression/decompression circuit card are included in the insurance company software.

The estimate transmission function is invoked when an estimate is to be received by the insurance company. The telecom database function is used to establish a communications link with the appropriate bodyshop computer system. Once the link is established, the data exchange function receives the estimate. It is also possible to transmit an estimate back to the bodyshop with notes/comments/questions on it. In this case, the data exchange function transmits the estimate.

From the foregoing, it is evident that there are a number of ways in which the system software can be structured for both the bodyshop system and the insurance company system. Variations of the particular embodiment herewith described will be obvious to one skilled in the art, and accordingly the embodiment is to be taken as illustrative rather than limitative, the true scope of the invention being set out in the appended claims.

We claim:

1. An electronic system for the preparation, transmission and reception of information concerning accidented vehicles comprising a first station, at which said accidented vehicle is located, and a second station, said first station comprising:

first processor means including first memory storage means;

means for acquiring video image signals representative of images of said accidented vehicles;

means for feeding said video image signals to said first processor means;

means for generating estimate data signals representative of cost estimates for fixing said accidented vehicles;

means for feeding said estimate data signals to said first processor means;

first means for compressing said video image signals and said estimate data signals to provide compressed image data and compressed estimate data;

first means for storing said compressed image data and said compressed estimate data in said first memory storage means; and first means for transmitting said compressed image data and said compressed estimate data to said second station;

said second station comprising means for receiving said compressed image data and said compressed estimate data, for viewing said received compressed image data and said received compressed estimate data, for amending said received compressed image data and said received compressed estimate data to provide amended compressed image data and amended compressed estimate data, or for approving said received compressed image data and said received compressed estimate data;

said second station also including second means for transmitting said amended compressed image data and amended compressed estimate data to said first station;

said first station further including means for receiving said amended compressed image data and said amended compressed estimate data, said first processor means including means for amending said amended compressed image data and said amended compressed estimate data or for approving said amended compressed image data and said amended compressed estimate data;

whereby, said first and second stations are in continuing interactive communication with each other.

2. A system as defined in claim 1, wherein said first station further includes first means for displaying images represented by said video image signals and estimates represented by said estimate data signals;

said first means for displaying being driven by said video image signals and said estimate data signals;

first means for feeding said video image signals and said estimate data signals to said first means for displaying.

3. A system as defined in claim 2 wherein said means for acquiring video image signals comprises a color video camera means;

said means for feeding said video image signals to said first processor means comprising a color video digitizer for converting the video image signals to computer manipulable data;

said first means for feeding said video image signals and said estimate data signals to said first means for displaying comprising a first high resolution color display circuit card;

said first means for displaying comprising a first high resolution color display monitor;

said first memory storage means comprising first mass storage media in the form of first hard disc drives, first floppy disc drives, and first W.O.R.M. (Write Once Read Many) optical storage systems;

said means for generating estimate data signals comprising a first keyboard; and said first means for transmitting comprising a first modem.

4. A system as defined in claim 3 and further including a first pointing device for graphically highlighting and textually annotating portions of said images;

said pointing device indicating whether a new image, or images from a different perspective, or a close-up image, are desired.

5. A system as defined in claim 4 wherein said second station is located at a separate location, said second station comprising;

second processor means including second memory storage means;

said second processor means comprising means for decompressing said received compressed image data and said received compressed estimate data into said video image signals and said estimate data signals;

second means for displaying said images represented by said video image signals and said estimates represented by said estimate data signals;

second means for storing said received compressed image data and said received compressed estimate data in said second memory storage means.

6. A system as defined in claim 5 wherein said second display means comprises a second high resolution color display monitor;

said system further including;

second means for feeding said image data to said second high resolution color display monitor comprising, a second high resolution color display card; and second means for feeding said estimate data to said second high resolution color display monitor comprising said second high resolution color display card;

said second memory storage means comprising second mass storage media in the form of second hard disc drives, second floppy disc drives, and second W.O.R.M. (Write Once Read Many) optical storage systems;

said means for amending comprising a second keyboard and a second pointing device;

said means for receiving comprising a second modem.

7. A system as defined in claim 6 whereby, said first and second stations communicating via their respective modems can amend estimate data signals or generate new estimate data signals.

8. A method of preparing and transmitting vehicle accident information from a first location to a second location, comprising:

obtaining, at said first location, video image signals representative of images of an accidented portion of the vehicle;

transforming the video image signals to digital image signals;

graphically highlighting and textually annotating the digital image signals;

compressing the digital image signals to provide compressed image signals;

generating digital cost estimate signals;

compressing said digital estimate signals to provide compressed estimate signals; and transmitting said compressed image signals and said compressed estimate signals to said second location.

9. A method as defined in claim 8 and further including;

receiving said compressed image signals and said compressed estimate signals at said second location;

decompressing said compressed image signals and said compressed estimate signals to provide digital image signals and digital estimate signals;

feeding said digital image signals and digital estimate signals to a display means;

displaying said images of said accidented portion of the vehicle and said cost estimates on said display means.

10. An electronic system for the preparation, transmission and reception of information concerning accidented vehicles, comprising a first station, said first station comprising:
- first processor means including first memory storage means;
- means for acquiring video image signals representative of images of said accidented vehicles;
- means for feeding said video image signals to said first processor means;
- first means for generating estimate data signals representative of cost estimates for fixing said accidented vehicles;
- means for feeding said estimate data signals to said first processor means;
- first means for compressing said video image signals and said estimate data signals to provide compressed image data and compressed estimate data;
- first means for storing said compressed image data and said compressed estimate data in said first memory storage means;
- first means for transmitting said compressed image data and said compressed estimate data;
- and further including first means for displaying images represented by said video image signals and estimates represented by said estimate data signals;
- and still further including a pointing device for graphically highlighting and textually annotating portions of said images;
- said printing device indicating whether a new image, or images from a different perspective, or a close-up image, are desired.

11. A system as defined in claim 10 wherein said first means for displaying is driven by said video image signals and said estimate data signals;
- first means for feeding said video image signals and said estimate data signals to said first means for displaying.

12. A system as defined in claim 11 wherein said means for acquiring video image signals comprises a color video camera means;
- said means for feeding said video image signals to said first processor means comprising a color video digitizer for converting the video image signals to computer manipulable data;
- said first means for feeding said video image signals and said estimate data signals to said first means for displaying comprising a first high resolution color display circuit card;
- said first means for displaying comprising a first high resolution color display monitor;
- said first memory storage means comprising first mass storage media in the form of first hard disc drives, first floppy disc drives, and first W.O.R.M. (Write Once Read Many) optical storage systems;
- said first means for generating estimate data signals comprising a first keyboard; and
- said first means for transmitting comprising a first modem.

13. A system as defined in claim 12 wherein a second station is located at a separate location, said second station comprising;
- second processor means including second memory storage means;
- means for receiving said compressed image data and said compressed estimate data;
- said second processor means comprising means for decompressing said received compressed image data and said received compressed estimate data into said video image signals and said estimate data signals;
- second means for displaying said images represented by said video image signals and said estimates represented by said estimate data signals;
- second means for storing said received compressed image data and said received compressed estimate data in said second memory means.

14. A system as defined in claim 13 wherein said second display means comprises a second high resolution color display monitor;
- said system further including;
- second means for feeding said image data to said second high resolution color display monitor comprising a second high resolution color display card; and
- second means for feeding said estimate data to said second high resolution color data display monitor comprising said second high resolution color display card;
- said second memory storage means comprising second mass storage media in the form of second hard disc drives, second floppy disc drives, and second W.O.R.M. (Write Once Read Many) optical storage systems;
- said means for receiving comprising a second modem.

15. A system as defined in claim 14 whereby, said first and second stations communicating via their respective modems can amend estimate data signals or generate new estimate data signals.

* * * * *

UNITED STATES PATENT AND TRADEMARK OFFICE
CERTIFICATE OF CORRECTION

PATENT NO. :   5,128,859
DATED      :   July 7, 1992
INVENTOR(S):   Albert R. Carbone et al It is certified that error appears in the above-identified patent and that said Letters Patent is hereby corrected as shown below:

Col. 1, line 17, after "An", insert --estimator retained by the insurance company must visit the --

Signed and Sealed this

Sixteenth Day of November, 1993

Attest:

BRUCE LEHMAN

*Attesting Officer*    Commissioner of Patents and Trademarks